(12) United States Patent
Shiotani

(10) Patent No.: US 12,175,142 B2
(45) Date of Patent: Dec. 24, 2024

(54) NON-TRANSITORY COMPUTER-READABLE RECORDING MEDIUM STORING COMPUTER-READABLE INSTRUCTIONS FOR TERMINAL DEVICE FOR DISPLAYING NOTIFICATION INFORMATION, TERMINAL DEVICE FOR DISPLAYING NOTIFICATION INFORMATION, AND METHOD FOR CONTROLLING TERMINAL DEVICE FOR DISPLAYING NOTIFICATION INFORMATION

(71) Applicant: BROTHER KOGYO KABUSHIKI KAISHA, Nagoya (JP)

(72) Inventor: Takeshi Shiotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/145,891

(22) Filed: Dec. 23, 2022

(65) Prior Publication Data

US 2023/0205468 A1 Jun. 29, 2023

(30) Foreign Application Priority Data

Dec. 27, 2021 (JP) ................................. 2021-212904

(51) Int. Cl.
  *G06F 3/12* (2006.01)
  *H04L 67/55* (2022.01)
  *H04N 1/00* (2006.01)

(52) U.S. Cl.
  CPC ............ *G06F 3/1236* (2013.01); *G06F 3/121* (2013.01); *H04L 67/55* (2022.05); *H04N 1/00474* (2013.01)

(58) Field of Classification Search
  CPC .............. G06F 3/1236; H04N 1/00474; H04N 1/00477; H04N 1/00472
  See application file for complete search history.

(56) References Cited

U.S. PATENT DOCUMENTS

| 2008/0304095 | A1* | 12/2008 | Saito | ...................... | G06K 15/02 |
|---|---|---|---|---|---|
| | | | | | 358/1.14 |
| 2015/0056974 | A1* | 2/2015 | Kim | .................. | H04M 1/72463 |
| | | | | | 455/418 |

(Continued)

FOREIGN PATENT DOCUMENTS

| JP | 2008305142 A | 12/2008 |
|---|---|---|
| JP | 2017068574 A | 4/2017 |

(Continued)

*Primary Examiner* — Benjamin O Dulaney
(74) *Attorney, Agent, or Firm* — Scully, Scott, Murphy & Presser, P.C.

(57) ABSTRACT

A terminal device may receive notification information from a notification server and selectively display one screen among a plurality of screens on a display. The terminal device may, in a case where a predetermined condition is satisfied and a first screen among the plurality of screens is displayed, display the notification information on the first screen. The terminal device may, in a case where the predetermined condition is satisfied and a second screen among the plurality of screens is displayed, not display the notification information on the second screen, and in a case where the predetermined condition is not satisfied, not display the notification information.

19 Claims, 11 Drawing Sheets

(56) References Cited

U.S. PATENT DOCUMENTS

| | | | |
|---|---|---|---|
| 2015/0100921 A1* | 4/2015 | Kang | H04N 1/00307 |
| | | | 715/808 |
| 2017/0094104 A1 | 3/2017 | Fujiwara | |
| 2017/0223127 A1* | 8/2017 | Matsutani | H04L 67/55 |
| 2018/0077304 A1* | 3/2018 | Sugawara | H04N 1/00973 |
| 2018/0091683 A1 | 3/2018 | Satake et al. | |
| 2018/0091686 A1 | 3/2018 | Satake et al. | |
| 2018/0103160 A1* | 4/2018 | Sugita | H04N 1/00925 |
| 2020/0045204 A1* | 2/2020 | Niimoto | H04N 1/4426 |
| 2021/0191673 A1* | 6/2021 | Ogawa | G06F 3/1229 |
| 2023/0007141 A1* | 1/2023 | Tanaka | G06F 16/9554 |
| 2023/0146770 A1* | 5/2023 | Yamazaki | G06F 8/61 |
| | | | 717/121 |
| 2023/0208988 A1* | 6/2023 | Shiotani | G06F 3/1232 |
| | | | 358/1.15 |

FOREIGN PATENT DOCUMENTS

| | | |
|---|---|---|
| JP | 2018055184 A | 4/2018 |
| JP | 2018055185 A | 4/2018 |

\* cited by examiner

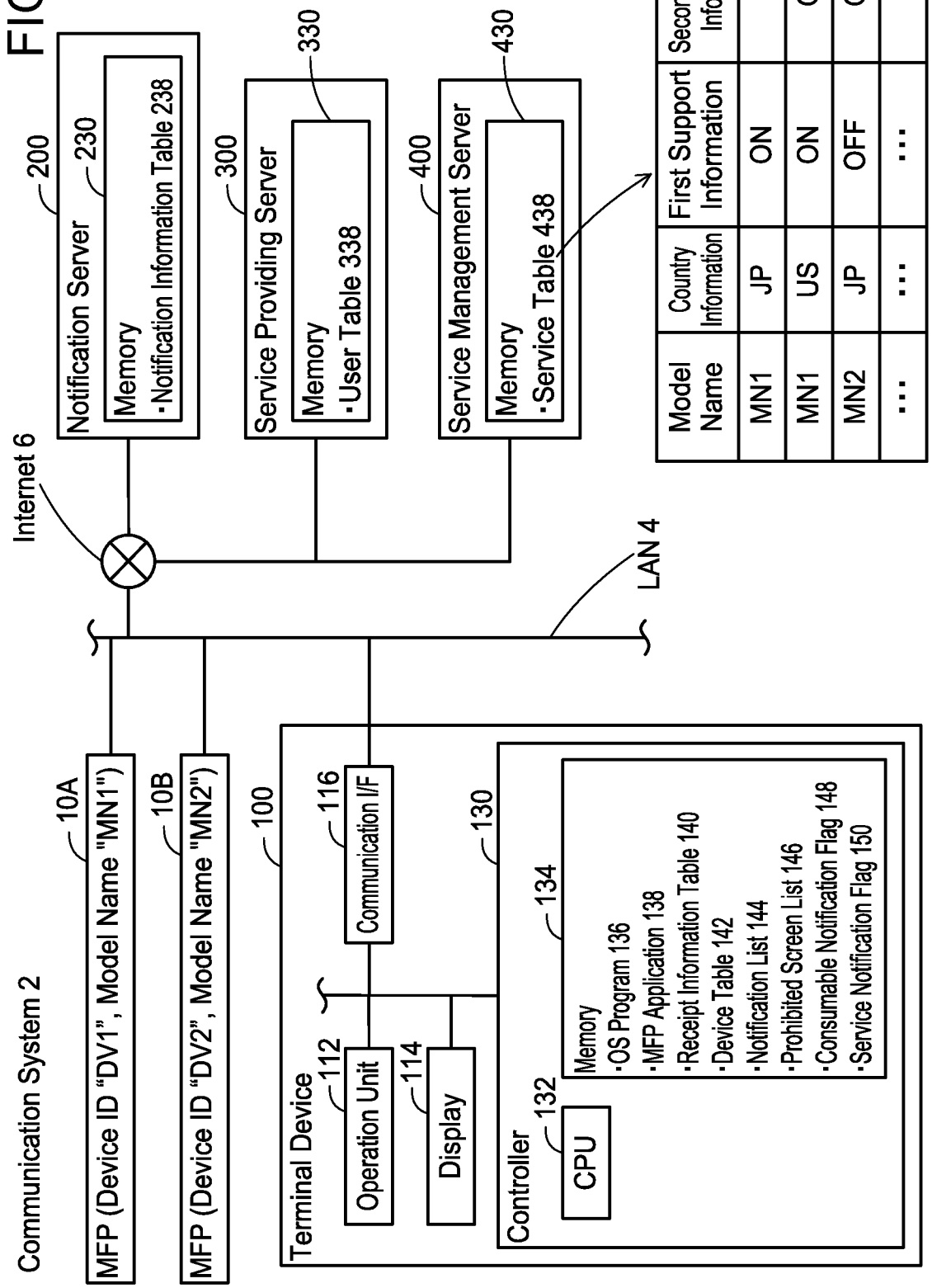

FIG. 2

Notification Information Table 238

| Notification ID | Type Information | First Registration Condition | Second Support Condiction | Consumable Condition | Timing Condition | Pull Notification Screen Data | |
|---|---|---|---|---|---|---|---|
| ID1 | Consumable | - | - | Remaining Amount≤Threshold | 1/1/2022 10:00 | MD1 | ←PL1 |
| ID2 | Service | Non-Registered | - | - | 1/2/2022 10:00 | MD2 | ←PL2 |
| ID3 | Service | Registered | ON | - | 1/3/2022 10:00 | MD3 | ←PL3 |

Pull Notification Information

Receipt Information Table 140

| Notification ID | Type Information | First Registration Condition | Second Support Condiction | Consumable Condition | Timing Condition | Pull Notification Screen Data | Display Information |
|---|---|---|---|---|---|---|---|
| ID1 | Consumable | - | - | Remaining Amount≤Threshold | 1/1/2022 10:00 | MD1 | Displayed |
| ID2 | Service | Not Registered | - | - | 1/2/2022 10:00 | MD2 | Not yet Displayed |
| ID3 | Service | Registered | ON | - | 1/3/2022 10:00 | MD3 | Not yet Displayed |

Pull Notification Information

Device Table 142

| Device ID | Model Name | First Registration Information | Second Registration Infromation | First Support Information | Second Support Information |
|---|---|---|---|---|---|
| DV1 | MN1 | Registered | Not Registered | ON | ON |

User Table 338

| User Name | Device ID | First Registration Information | Second Registration Information |
|---|---|---|---|
| U1 | DV1 | Registered | Not Registered |

FIG. 3

Prohibited Screen List 146

| Print Preview Screen |
| Print Setting Screen |
| Print Image Edit Screen |
| Print Executing Screen |
| Scan Setting Screen |
| Scan Image Edit Screen |
| Scan Executing Screen |
| WFD Setting Screen |
| Wi-Fi Set up Screen |
| ... |

NON-TRANSITORY COMPUTER-READABLE RECORDING MEDIUM STORING COMPUTER-READABLE INSTRUCTIONS FOR TERMINAL DEVICE FOR DISPLAYING NOTIFICATION INFORMATION, TERMINAL DEVICE FOR DISPLAYING NOTIFICATION INFORMATION, AND METHOD FOR CONTROLLING TERMINAL DEVICE FOR DISPLAYING NOTIFICATION INFORMATION

REFERENCE TO RELATED APPLICATIONS

This application claims priority from Japanese Patent Application No. 2021-212904 filed on Dec. 27, 2021. The entire content of the priority application is incorporated herein by reference.

BACKGROUND ART

A communication system including a cellphone, a printer and a push notification server is known. The cellphone sends acquisition request information for a push notification ID to the server, receives the push notification ID from the push notification server and sends the push notification ID to the printer. The printer sends the push notification ID to the push notification server. When the push notification server receives the push notification ID from the printer, the push notification server sends the push notification information to the cellphone. When the cellphone receives the push notification information from the push notification server, the cellphone displays a notification image.

DESCRIPTION

The present disclosure provides a technique which can enhance user convenience.

The disclosure discloses a non-transitory computer-readable recording medium storing computer-readable instructions for a terminal device. The terminal device may comprise: a processor: and a display. The computer-readable instructions, when executed by the processor, may cause the terminal device to: receive notification information from a notification server; selectively display one screen among a plurality of screens on the display; and in a case where a predetermined condition is satisfied and a first screen among the plurality of screens is displayed, display the notification information on the first screen; in a case where the predetermined condition is satisfied and a second screen among the plurality of screens is displayed, not display the notification information on the second screen; and in a case where the predetermined condition is not satisfied, not display the notification information.

According to the above configuration, the terminal device receives the notification information from the server. The terminal device selectively displays one of the plurality of screens. When the predetermined condition is satisfied and the first screen among the plurality of screens is displayed, the terminal device displays the notification information on the first screen. When the predetermined condition is satisfied and the second screen among the plurality of screens is displayed, the terminal device does not display the notification information on the second screen. When the predetermined condition is not satisfied, the terminal device does not display the notification information. As described above, depending on the screen displayed on the display of the terminal device, whether to display the notification information can be changed. Accordingly, user convenience can be enhanced.

A computer-readable recording medium storing the above computer-readable instructions, a terminal device implemented by the computer-readable instructions and a method for controlling the above terminal device are also novel and useful. A communication system comprising the above terminal device and the notification server is also novel and useful.

FIG. 1 illustrates a configuration of a communication system.

FIG. 2 illustrates examples of tables.

FIG. 3 illustrates an example of a prohibited screen list.

Figure 4:
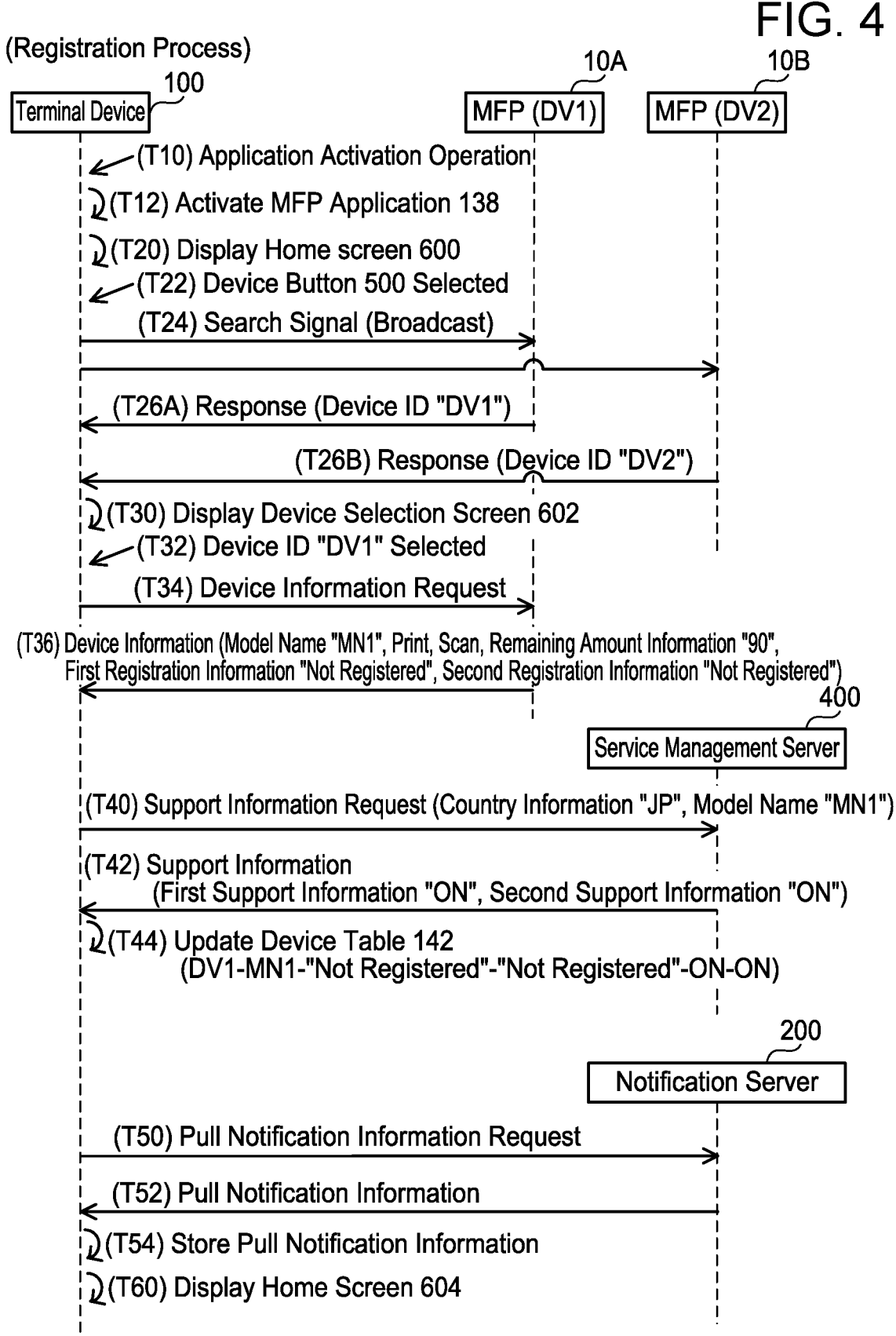
FIG. 4 illustrates a sequence diagram of a registration process.

(Embodiment)
(Configuration of Communication System 2; FIG. 1)

As illustrated in FIG. 1, a communication system 2 includes a plurality of MFPs 10A, 10B, a terminal device 100, a notification server 200, a service providing server 300 and a service management server 400. The MFPs 10A, 10B and the terminal device 100 are connected to Local Area Network (LAN) 4. The MFPs 10A, 10B and the terminal device 100 are configured to communicate with each other via the LAN 4. The LAN 4 is connected to the Internet 6. The MFPs 10A,10B, the terminal device 100, the notification server 200, the service providing server 300 and the service management server 400 are connected to the Internet 6. The MFPs 10A, 10B, the terminal device 100, the notification server 200, the service providing server 300 and the service management server 400 are configured to communicate with each other via the Internet 6.

(Configurations of MFPs 10A, 10B)

The MFPs 10A, 10B are peripheral devices configured to execute a print function and a scan function (i.e., peripheral devices of a PC, etc.). The MFP 10A has a device name "DV1" and a model name "MN1". The MFP 10B has a device name "DV2" and a model name "MN2". The device name is a name given by an administrator of the MFPs to each of the MFPs 10A, 10B. The Model name is a name representing a model of each MFP. The MFPs 10A, 10B are manufactured by the same vendor. Hereafter, the MFP 10A and the MFP 10B may collectively be referred to as "MFP(s) 10".

(Configuration of Terminal Device 100)

The terminal device 100 is a portable terminal device such as a cell phone (e.g., a smartphone), a PDA or a tablet PC. The terminal device 100 includes an operation unit 112, a display 114, a communication interface 116 and a controller 130. Hereafter, the interface will be referred to as "I/F".

The operation unit 112 is for example a touch screen. The operation unit 112 is configured to accept various instructions. The display 114 displays various kinds of information.

The display 114 may be a panel or a display device. The communication I/F 116 is connected to the LAN 4.

The controller 130 includes a CPU 132 and a memory 134. The CPU 132 executes various processes in accordance with an Operating System (OS) program 136 (hereafter simply be referred to as "OS 136") stored in the memory 134. The memory 134 further includes an MFP application 138 (hereafter simply be referred to as "app 138"), a receipt information table 140, a device table 142, a notification list 144, a prohibited screen list 146, a consumable notification flag 148, and a service notification flag 150. The app 138 is a program to cause the MFPs 10A, 10B to execute the print function and the scan function. The notification list 144 is a list of notification information to be displayed. The consumable notification flag 148 indicates a value that is either "ON" indicating that a pull notification screen related to a consumable is allowed to pop up or "OFF" indicating that the pull notification screen related to a consumable is prohibited to pop up. The service notification flag 150 indicates a value that is either "ON" indicating that a pull notification screen related to a service provided by the service providing server 300 is allowed to pop up or "OFF" indicating that the pull notification screen related to this service is prohibited to pop up. The consumable notification flag 148 and the service notification flag 150 can be set by a user.

(Configuration of Notification Server 200)

The notification server 200 is provided on the Internet 6 by a provider different from the vendor of the MFP 10. In a modification, the notification server 200 may be provided on the Internet 6 by this vendor. In another modification, the vendor of the MFP 10 may use an environment provided by an external cloud computing service without preparing its own hardware for the notification server 200. In this case, the vendor of the MFP 10 may implement the notification server 200 by preparing a program (i.e., a software) for the notification server 200 and introducing it to the above environment. The notification server 200 is a server configured to provide push notification information including push notification screen data and pull notification information including pull notification screen data. The pull notification information is data sent from the notification server 200 to the terminal device 100 in response to a pull notification information request for requesting the notification server 200 to send the pull notification information being sent from the terminal device 100 to the notification server 200. The push notification information is data automatically sent from the notification server 200 to the terminal device 100 without the push notification information request for requesting the notification server 200 to send the push notification information being sent from the terminal device 100 to the notification server 200. The push notification information and the pull notification information are registered in the notification server 200 in response to the vendor providing the notification server 200 being requested to do so by the vendor of the MFP 10, or the like. The notification server 200 includes a memory 230. The memory 230 stores the notification information table 238.

(Configurations of Service Providing Server 300 and Service Management server 400)

The service providing server 300 and the service management server 400 are provided on the Internet 6 by the vendor of the MFP 10. In a modification, the service providing server 300 and the service management server 400 may be provided on the Internet 6 by a provider different from this vendor. In another modification, the vendor of the MFP 10 may use an environment provided by an external cloud computing service without preparing its own hardware for the service providing server 300 and the service management server 400. In this case, the vendor of the MFP 10 may implement the service providing server 300 and the service management server 400 by preparing a program (i.e., a software) for the service providing server 300 and the service management server 400 and introducing it to the above environment.

The service providing server 300 is a server for providing a service related to the MFP 10. The service providing server 300 provides a remote print service and a flat-rate service. In a modification, the service providing server 300 may further provide a push scan service and the like. The remote print service is a service for sending a print instruction to the MFP 10 via the service providing server 300 from outside home or office. The flat-rate service is a service of charging predetermined fees when the number of sheets printed in a predetermined period (e.g., one month) is equal to or less than the contractual number of print sheets (e.g., 1000 sheets). This service charges a flat-rate fee as above and also an additional fee that is dependent on the number of printed sheets exceeding the contractual number of printed sheets when the number of sheets printed in the predetermined period exceeds the contractual number of printed sheets (hereafter this service may be referred to as "flat-rate service"). The flat-rate service includes an automatic ordering service of automatically ordering a new cartridge when a remaining amount of ink in the cartridge attached to the MFP 10 is equal to or less than a predetermined remaining amount. The service providing server 300 includes a memory 330. A user table 338 is stored in the memory 330.

The service management server 400 is a server for managing support information of the remote print service and the flat-rate service. The service management server 400 includes a memory 430. A service table 438 is stored in the memory 430. In the service table 438, a model name, country information (e.g., "JP", "US"), first support information and second support information are stored in association with each other. The first support information indicates a value that is either "ON" indicating the remote print service is supported or "OFF" indicating that the remote print service is not supported. The second support information indicates a value that is either "ON" indicating that the flat-rate service is supported or "OFF" indicating that the flat-rate service is not supported.

(Configurations of Tables; FIG. 2)

Next, with reference to FIG. 2, contents of the receipt information table 140 and the device table 142 in the terminal device 100, the notification information table 238 in the notification server 200, and the user table 338 in the service providing server 300 will be described.

The notification information table 238 in the notification server 200 is a table for managing pull notification information (e.g., PL1 to PL3). The pull notification information includes a notification ID for identifying the pull notification information, type information, a timing condition and pull notification scree data corresponding to a pull notification screen. The type information indicates one of "consumable" indicating that the pull notification screen is a screen related to a consumable and "service" indicating that the pull notification screen is a screen related to a service. The timing condition is information indicating a timing at which the pull notification screen is to pop up. In the present embodiment, date-and-time information (e.g., "Jan. 1, 2022 10:00") is registered as the timing condition. In a modification, period information (e.g., "Jan. 1, 2022 10:00 to Jan. 10, 2022 10:00") indicating a period for which the pull notification screen can pop up may be registered as the timing condition. The pull notification information may further include a first registration condition, a first support condition, a second support condition, and a consumable condition. The respective conditions are information to limit a target screen on which the pull notification screen is pop-up displayed. The first registration condition is information indicating a condition to change whether to pop up the pull notification screen or not depending on whether the MFP 10 is registered in the remote print service. The first registration condition includes one of "registered" indicating that the pull notification is pop-up displayed when the MFP 10 is already registered to the remote print service and "not registered" indicating that the pull notification screen is pop-up displayed when the MFP 10 is not registered to the remote print service. The first support condition is information indicating a condition to change whether to pop up the pull notification screen depending on whether the MFP 10 registered in the app 138 supports the remote print service. The first support condition includes "ON" indicating that the pull notification screen is pop-up displayed when the remote print service is supported. The second support condition is information indicating a condition to change whether to pop up the pull notification screen depending on whether the MFP 10 registered in the app 138 supports the flat-rate service. The second support condition includes "ON" indicating that the pull notification screen is pop-up displayed when the flat-rate service is supported. The consumable condition is information indicating a condition to change whether to pop up the pull notification screen depending on the status of a consumable (in the present embodiment, a cartridge) attached to the MFP 10 registered in the app 138. The consumable condition includes "remaining amount≤threshold" indicating that the pull notification screen is pop-up displayed when the remaining amount of the cartridge is equal to or lower than a threshold (e.g., "30").

The receipt information table 140 in the terminal device 100 is a table to manage pop-up display of the pull notification information received from the notification server 200. In the receipt information table 140, the pull notification information (e.g., PL1 to PL3) and display information are stored in association with each other. The display information indicates one of "displayed" indicating that the pull notification screen corresponding to the display information has already been pop-up displayed and "not yet displayed" indicating that this notification screen has not been pop-up displayed yet.

The device table 142 in the terminal device 100 is a table for managing information related to the MFP 10 registered in the app 138. In the device table 142, a device ID, a model name, first registration information, second registration information, first support information and second support information are stored in association with each other. The first registration information indicates one of "registered" indicating that registration for using the remote print service is completed and "not registered" indicating that registration for using the remote print service is not completed. The second registration information indicates one of "Registered" indicating that registration for using the flat-rate service is completed and "Not registered" indicating that registration for using the flat-rate service is not completed.

The user table 338 in the service providing server 300 is a table for managing information related to the user. In the user table 338, a user name for identifying the user, the device ID, the first registration information and the second registration information are stored in association with each other. The user ID is registered when the user subscribes to the remote print service or the flat-rate service.

(Prohibited screen List 146; FIG. 3)

With reference to FIG. 3, a prohibited screen list 146 in the terminal device 100 will be described. The prohibited screen list 146 is a list of screens on which pop-up display of the push notification screen or the pull notification screen is prohibited (hereafter the screens may be referred to as "prohibited screen"). In the present embodiment, screens related to a print instruction (e.g., a print preview screen, a print setting screen and a print executing screen), screens related to a scan instruction (e.g., a scan setting screen and scan executing screen), screens for editing image data (e.g., print image data, scan image data) (e.g., print image edit screen and scan image edit screen) and screens for establishing a wireless connection with an external device (e.g., a WFD setting screen and Wi-Fi set up screen) are stored in the prohibited screen list 146. The WFD setting screen is a screen for establishing a Wi-Fi Direct (registered trademark, WFD) connection between the MFP 10 and the terminal device 100. The Wi-Fi set up screen is a screen for establishing a Wi-Fi connection between the MFP(s) 10 and AP(s) (not illustrated).

Figure 5:
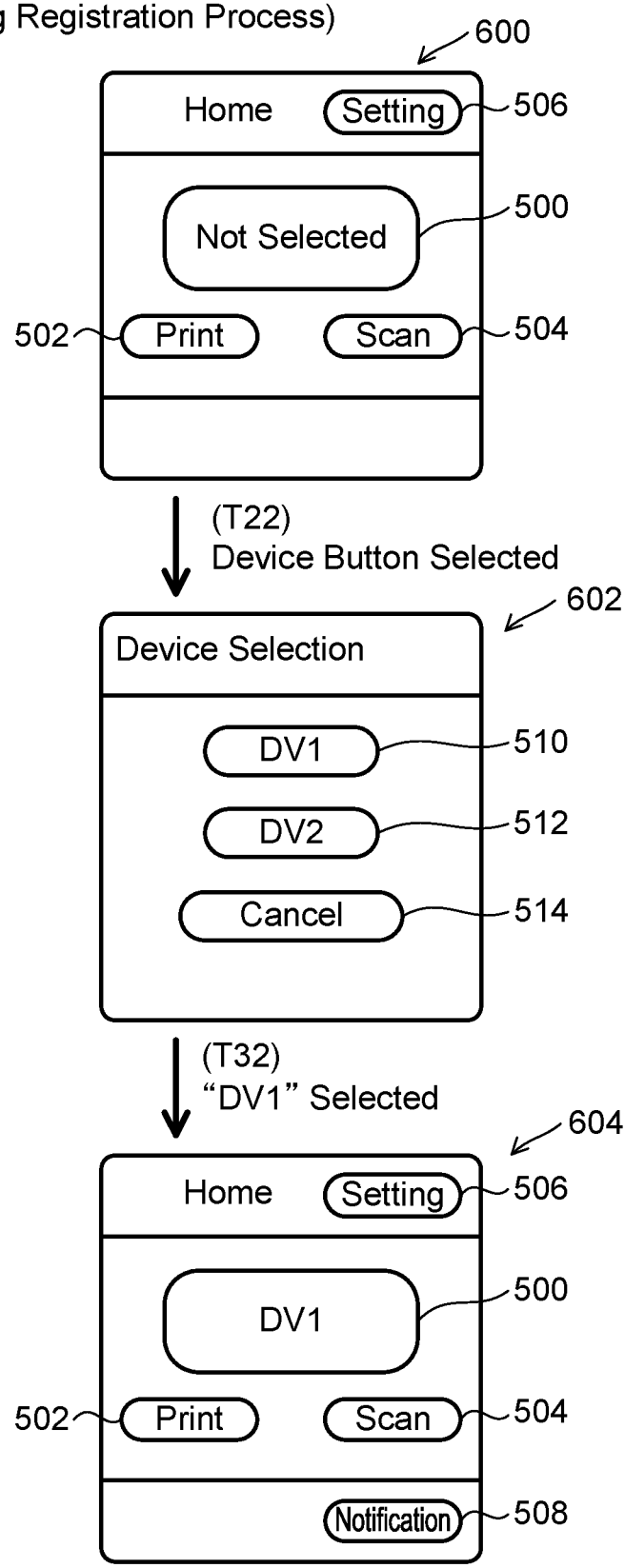
FIG. 5 illustrates an example of a screen displayed on a terminal device during the registration process.

(Registration Process; FIG. 4, FIG. 5)

A registration process will be described with reference to FIG. 4 and FIG. 5. The registration process is a process for registering the MFP 10A in the app 138. Hereafter, all the communication executed between the terminal device 100 and other devices (MFP 10, the notification server 200, the service providing server 300 and the service management server 400) are executed via the communication I/F 116 of the terminal device 100. Accordingly, the recitation "via the communication I/F 116" will be omitted. Further, hereafter when the process executed by the CPU 132 of the terminal device 100 in accordance with the OS 136 or the app 138 is explained, the OS 136 or app 138 will be described as a subject of the processes.

When the OS 136 of the terminal device 100 accepts an operation to activate the app 138 in T10, the OS 136 supplies an activation instruction to the app 138 in T12. The app 138 is activated in response to acquiring the activation instruction from the OS 136. Next, the app 138 displays the home screen 600 on the display 114. Specifically, the app 138 supplies a display instruction for displaying the home screen 600 to the OS 136 and the OS 136 displays the home screen 600 on the display 114. In other words, the app 138 displays the home screen 600 on the display 114 via the OS 136. Hereafter, the recitation "via the OS 136" in the cases where the app 138 instructs to display a screen on the display 114 will be omitted. As illustrated in FIG. 5, the home screen 600 includes a device button 500, a print button 502, a scan button 504 and a setting button 506. The setting button 506 is a button for displaying an app setting screen 620 (see FIG. 10) to be described later. On the device button 500, a device name (e.g., "DV1", "DV2") of an MFP registered as an MFP which is to execute a print function or a scan function, or information "not selected" indicating that an MFP which is to execute a printing function or a scan function is not registered is displayed. In the present process, the information "not selected" indicating that an MFP which is to execute a printing function or a scan function is not selected is displayed on the device button 500.

When the app 138 accepts selection of the device button 500 in T22 of FIG. 4, the app 138 broadcasts a search signal in T24. Specifically, the app 138 supplies, to the OS 136, a sending instruction for causing the OS 136 to send the search signal and the OS 136 broadcasts the search signal. In other words, the app 138 broadcasts the search signal via the OS 136. Hereafter, the recitation "via the OS 136" in the cases in which the app 138 sends a signal to an external device (e.g., the MFP 10A) will be omitted. The search signal is a signal for requiring each of one or more peripheral devices (e.g., MFPs 10A, 10B) connected to the LAN 4 to send a response signal including a device ID of the peripheral device. The app 138 receives a response including the device ID "DV1" from the MFP 10A in T26A and receives a response including the device ID "DV2" from the MFP 10B in T26B. Specifically, the OS 136 receives the response including the device ID "DV1" from the MFP 10A and the app 138 acquires the response including the device ID "DV1" from the OS 136. In other words, the app 138 receives the response from the MFP 10A via the OS 136. Hereafter, the recitation "via the OS 136" in the cases in which the app 138 receives a signal from an external device (e.g., the MFP 10A) will be omitted. Next, the app 138 displays a device selection screen 602 on the display 114 in T30. As illustrated in FIG. 5, the device selection screen 602 includes a first device selection button 510 including the device ID "DV1", a second device selection button including the device ID "DV2" and a cancel button 514.

When the app 138 accepts selection of the first device selection button 510 (i.e., the device ID "DV1") in T32 of FIG. 4, the app 138 sends a device information request to the MFP 10A having the device ID "DV1" in T34. The device information request is a signal requesting for sending of device information including the model name of the MFP 10, functions which the MFP 10 can execute, remaining amount information indicating a remaining amount of a cartridge attached to the MFP 10, the first registration information and the second registration information. In T36, the app 138 receives the device information including the model name "MN1", the print function, the scan function, the remaining amount information "90", the first registration information "not registered" and the second registration information "not registered" from the MFP 10A.

In T40, the app 138 sends, to the service management server 400, a support information request including the country information "JP" indicating that a country where the MFP 10A is set up is Japan and the model name "MN1". The support information request is a signal requesting for sending of first support information and second support information associated with the country information and the model name in the request.

When the service management server 400 receives the support information request from the terminal device 100 in T40, the service management server 400 identifies, in the service table 438, the first support information "ON" and the second support information "ON" associated with the model name "MN1" and the country information "JP" in the request. Then, in T42, the service management server 400 sends support information including the first support information "ON" and the second support information "ON" to the terminal device 100.

When the app 138 receives the support information from the service management server 400 in T42, the app 138 stores the received device ID "DV1" (see T26A), the received model name "MN1" (see T36), the received first registration information "not registered" (see T36), the received second registration information "not registered" (see T36), the received first support information "ON" (see T42) and the received second support information "ON" (see T42) in the device table 142 in association with each other in T44. Specifically, the app 138 supplies an instruction to store the respective information (the device ID "DV1", the model name "MN1", the first registration information "not registered", the second registration information "not registered", the first support information "ON" and the second support information "ON") to the OS 136 and the OS 136 stores the information in the device table 142. In other words, the app 138 stores the respective information in the device table 142 via the OS 136. Hereafter, the recitation "via the OS 136" in the cases in which the app 138 stores information in the memory 134 will be omitted. Thereafter, the app 138 periodically (e.g., every 24 hours) sends the support information request to the service management server 400. In other words, the app 138 repeatedly sends the support information request to the service management server 400.

Next, the app 138 sends the pull notification information request to the notification server 200 in T50. The pull notification information request is a signal requesting for sending of the pull notification information which the notification server 200 stores. The app 138 receives the pull notification information from the notification server 200 in T52 and stores the pull notification information in T54. Specifically, the app 138 stores the received pull notification information and the display information "not yet displayed" in the receipt information table 140 in association with each other. Then, the app 138 displays the home screen 604 on the display 114 in T60. As illustrated in FIG. 5, the home screen 604 is the same as the home screen 600 except that the device ID "DV1" is displayed on the device button 500 and includes a notification button 508. The notification button 508 is a button for displaying a notification list screen including a list of the pull notification information in the receipt information table 140. When T60 ends, the registration process ends. Consequently, the user can use the terminal device 100 to cause the MFP 10A to execute a print function and a scan function. Thereafter, the app 138 periodically (e.g., every 12 hours) receives the device information from the MFP 10A.

Figure 6:
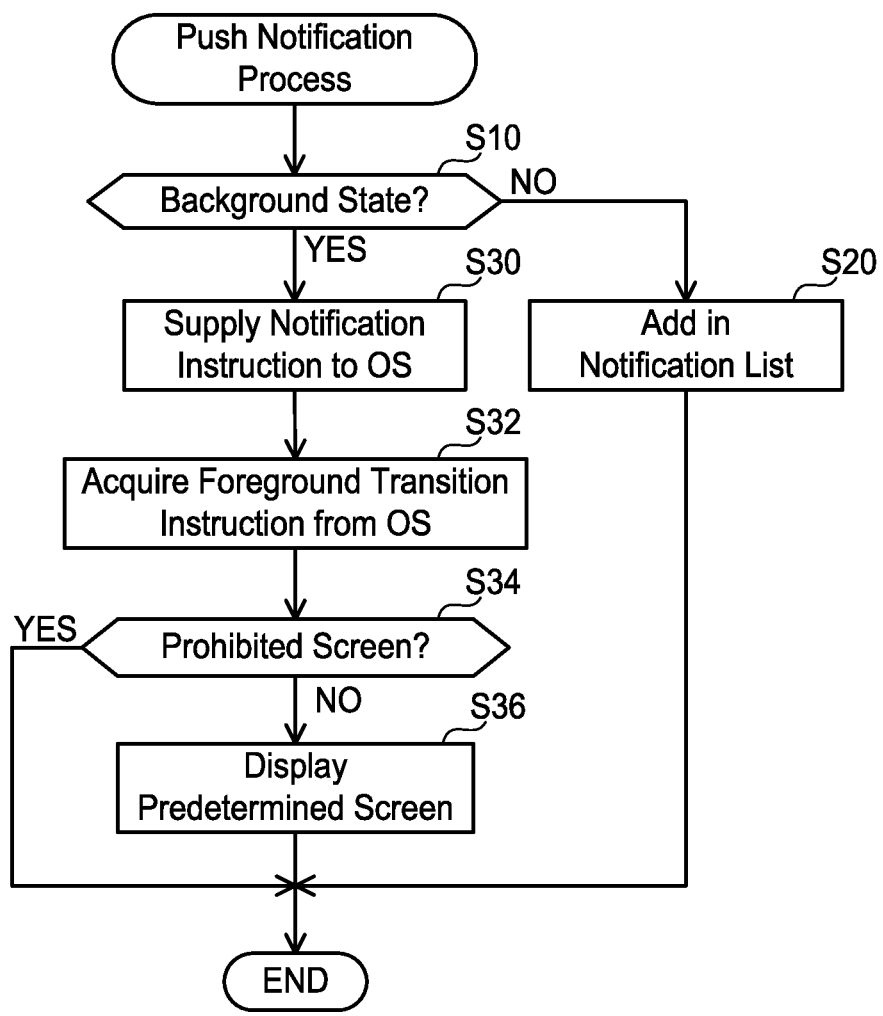
FIG. 6 illustrates a flowchart of a push notification process.

(Push Notification Process; FIG. 6)

Next, with reference to FIG. 6, the push notification process executed by the app 138 will be described. When the push notification information is received from the notification server 200, the app 138 starts the process of FIG. 6.

In S10, the app 138 determines whether the state of the app 138 is a background state or not. The background state is a state in which the app 138 is activated but a screen corresponding to the app 138 is not displayed on the display 114. Hereafter, the state in which the app 138 is activated and the screen corresponding to the app 138 is displayed on the display 114 (e.g., the state of FIG. 5) will be referred to as a foreground state. The app 138 proceeds to S20 when the state of the app 138 is the background state (YES in S10), while the app 138 proceeds to S30 when the state of the app 138 is not the background state (NO in S10).

In S20, the app 138 stores the received push notification information in the notification list 144. When the process of S20 ends, the app 138 ends the process of FIG. 6.

In S30, the app 138 supplies a notification instruction to the OS 136. The notification instruction is a signal to instruct to pop up the push notification screen corresponding to the received push notification information. When the notification instruction is acquired from the app 138, the OS 136 displays the push notification screen corresponding to the acquired push notification information as a pop-up on the display 114. Then, when the OS 136 accepts selection of the push notification screen, the OS 136 supplies a foreground transition instruction to the app 138. The foreground transition instruction is an instruction to cause the state of the app 138 to transition from the background state to the foreground state, and is also an instruction for causing the app 138 to display a predetermined screen designated by the received push notification information (e.g., remote print service introduction screen 626 (see FIG. 10)). The predetermined screen is a screen corresponding to screen data which the app 138 stores in advance.

In S32, the app 138 acquires the foreground transition instruction from the OS 138 and in S34, the app 138 determines if the screen to be displayed on the display 114 when the state of the app 138 transitions from the background state to the foreground state is the prohibited screen. When the app 138 transitions from the background state to the foreground state, the app 138 displays a screen which is last-displayed in the previous foreground state (hereafter the screen may be referred to as "previous screen") on the display 114. Thus, the app 138 determines whether the previous screen is the prohibited screen. When the previous screen is not the prohibited screen (NO in S34), the app 138 proceeds to S36. On the other hand, when the previous screen is the prohibited screen (YES in S34), the app 138 ends the process of FIG. 6.

In S36, the app 138 causes the state of the app 138 to transition from the background state to the foreground state and displays the predetermined screen instead of the previous screen on the display 114. When S36 ends, the app 138 ends the process of FIG. 6.

Figure 7:
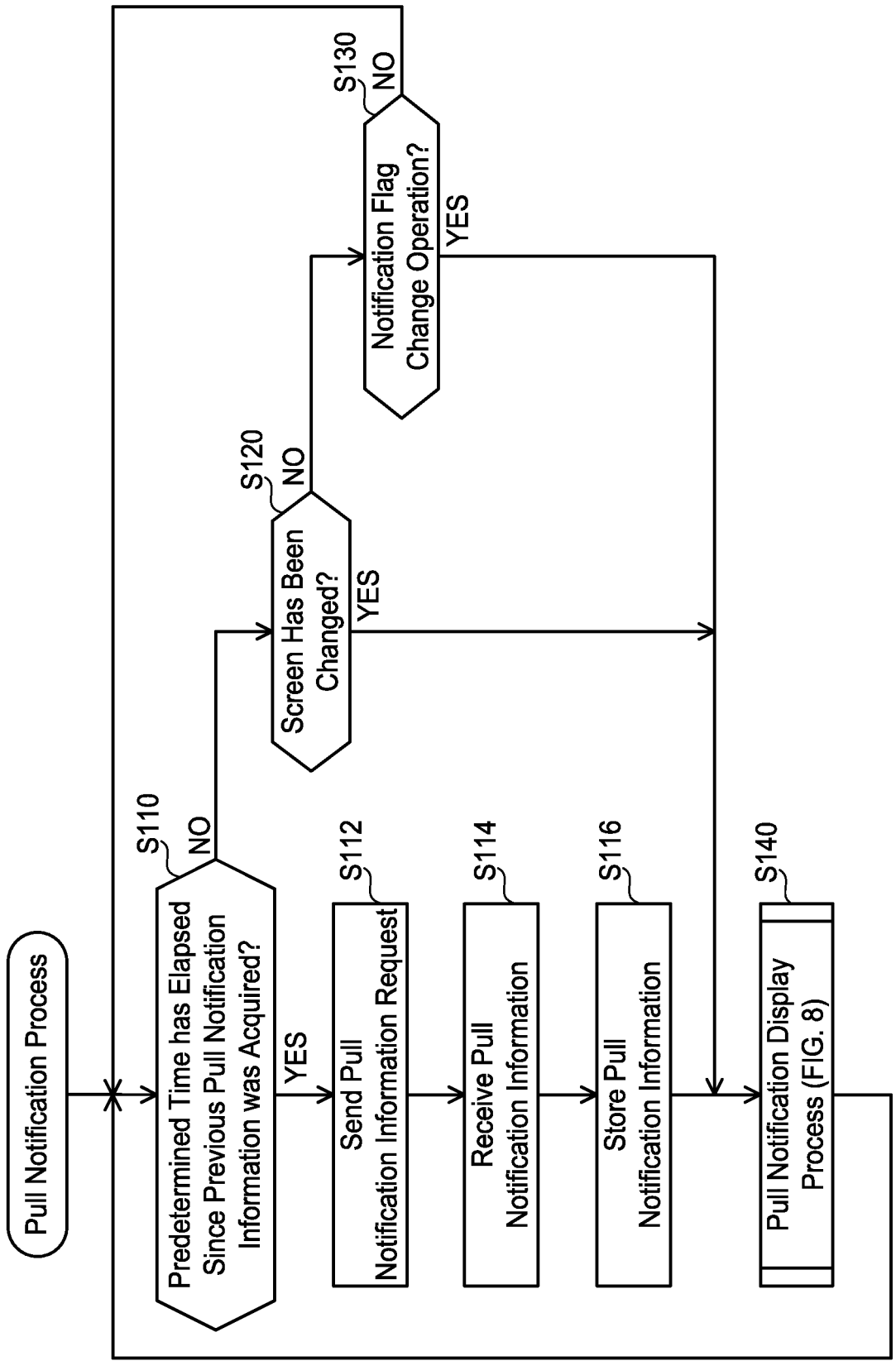
FIG. 7 illustrates a flowchart of a pull notification process.

(Pull Notification Process; FIG. 7)

Next, with reference to FIG. 7, the pull notification process executed by the app 138 will be described. When the app 138 is activated or the state of the app 138 transitions from the background state to the foreground state after the registration process (see FIG. 4) has been completed, the app 138 starts the process of FIG. 7.

In S110, the app 138 monitors a predetermined time (e.g., 24 hours) having elapsed since the pull notification information was previously received from the notification server 200. When the predetermined time has elapsed since the pull notification information was previously received from the notification server 200, the app 138 determines YES in S110 and proceeds to S112.

The app 138 sends the pull notification information request to the notification server 200 in S112 and receives the pull notification information from the notification server 200 in S114. Next, in S116, the app 138 stores the received pull notification information and the display information "not yet displayed" in association with each other in the receipt information table 140. When S116 ends, the app 138 proceeds to S140.

At the same time as the monitoring in S110, the app 138 determines if the screen displayed on the display 114 has been changed in S120. When the app 138 determines that the screen displayed on the display 114 has been changed, the app 138 determines YES in S120 and proceeds to S140.

Further, at the same time as the monitoring of S110 and S120, the app 138 determines whether the app 138 has accepted an operation to change either the consumable notification flag 148 or the service notification flag 150 (hereafter this operation may be referred to as "notification flag change operation") in S130. When the app 138 accepts the notification flag change operation, the app 138 determines YES in S130 and proceeds to S140.

Figure 8:
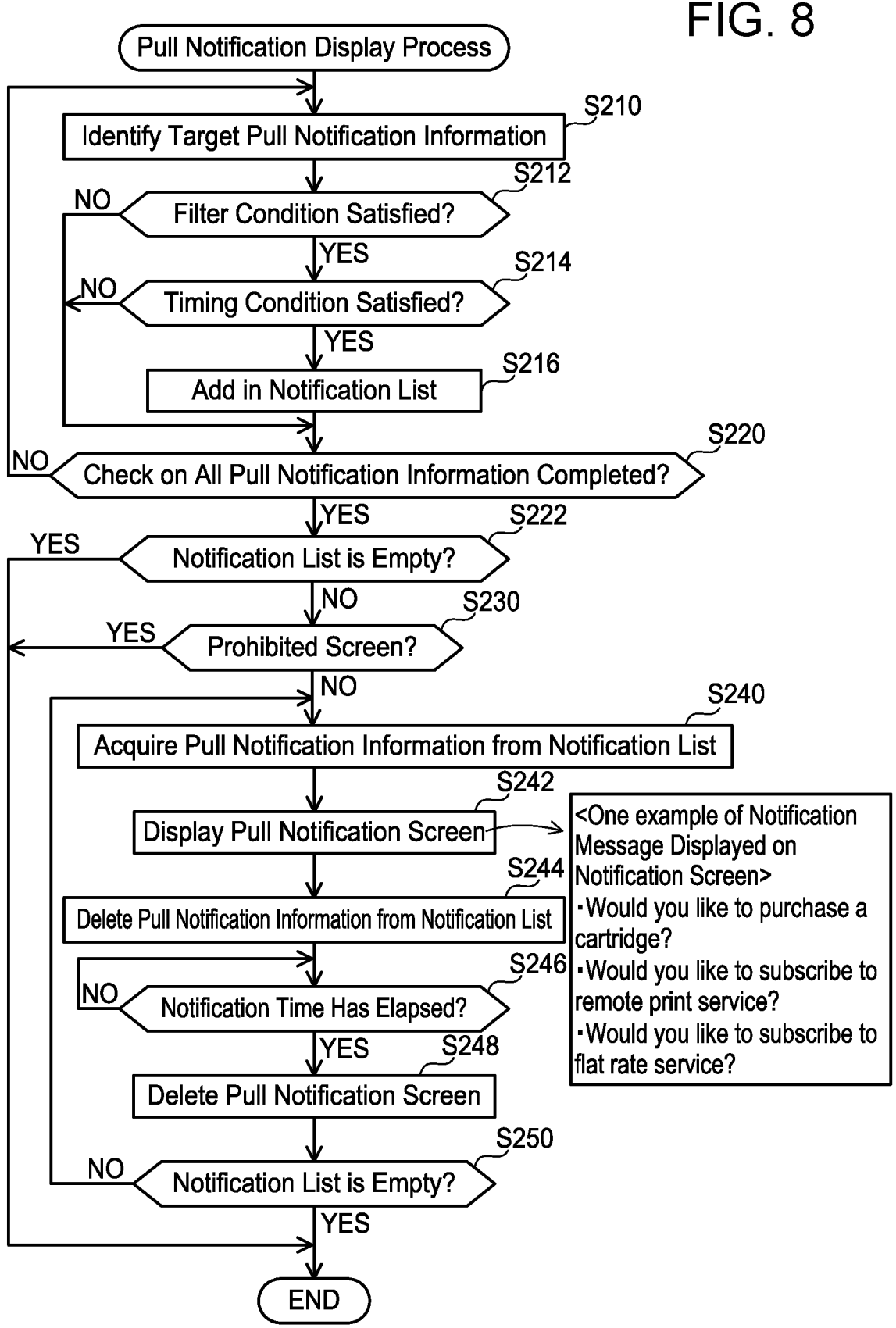
FIG. 8 illustrates a flowchart of a pull notification display process.

In S140, the app 138 executes a pull notification display process (see FIG. 8). The pull notification display process is a process to determine whether to pop up the pull notification screen on the display 114. When the process of S140 ends, the app 138 returns to S10.

(Pull Notification Display Process; FIG. 8)

Next, with reference to FIG. 8, the pull notification display process executed in S140 of FIG. 7 will be described. In S210, the app 138 identifies one piece of pull notification information associated with the display information "not yet displayed" in the receipt information table 140 as target pull notification information.

In S212, the app 138 determines whether a filter condition is satisfied by using the target pull notification information. The app 138 proceeds to S214 when the filter condition is satisfied (YES in S212), while the app 138 proceeds to S220 when the filter condition is not satisfied (NO in S212). Hereafter, the process of determining whether the filter condition is satisfied (hereafter the process may be referred to as "filter condition process") will be described. First, the app 138 identifies the type information in the target pull notification information ("consumable" or "service"). Then, the app 138 determines whether the notification flag corresponding to the identified type information (the consumable notification flag 148 or the service notification flag 150) is "ON" or not. When the notification flag corresponding to the identified type information is "OFF", the app 138 determines that the filter condition is not satisfied (NO in S212). On the other hand, when the notification flag corresponding to the identified type information is "ON", the app 138 continues the filter condition process. Next, the app 138 determines whether the target pull notification information includes the first registration condition or not. When the target pull notification information includes the first registration condition, the app 138 determines whether the first registration condition and the first registration information of the selected MFP 10 in the device table 142 match or not. When the first registration condition and the first registration information do not match, the app 138 determines that the filter condition is not satisfied (NO in S212). On the other hand, when the first registration condition and the first registration information match, the app 138 continues the filter condition process. Next, the app 138 determines whether the target pull notification information includes the first support condition or not. When the target pull notification information includes the first support condition, the app 138 determines whether the first support information of the selected MFP 10 in the device table 142 is "ON" or not. When the first support information is "OFF", the app 138 determines that the filter condition is not satisfied since the first support condition is not satisfied (NO in S212). On the other hand, when the first support information is "ON", the app 138 determines that the first support condition is satisfied and continues the filter condition process. When the target pull notification information does not include the first support condition as well, the app 138 continues the filter condition process. Next, the app 138 determines whether the target pull notification includes the second support condition. When the target pull notification information includes the second support condition, the app 138 determines whether the second support information of the selected MFP in the device table 142 is "ON" or not. When the second support information is "OFF", the app 138 determines that the filter condition is not satisfied since the second support condition is not satisfied (NO in S212). On the other hand, when the second support information is "ON", the app 138 determines that the second support condition is satisfied and continues the filter condition process. When the target pull notification information does not include the second support condition as well, the app 138 continues the filter condition process. Then, the app 138 determines whether the target pull notification information includes the consumable condition or not. When the target pull notification information includes the consumable condition, the app 138 determines whether the remaining amount indicated by the remaining amount information of the selected MFP 10 stored in the memory 134 is equal to or lower than a threshold in the consumable condition. When the remaining amount is greater than the threshold, the app 138 determines that the filter condition is not satisfied since the consumable condition is not satisfied (NO in S212). On the other hand, when the remaining amount is equal to or lower than the threshold, the app 138 determines that the consumable support condition is satisfied and determines that the filter condition is satisfied. When the target pull notification information does not include the consumable condition as well, the app 138 determines that the filter condition is satisfied. As described above, when the notification flag corresponding to the type information included in the target pull notification is "ON" and when all the conditions (except the timing condition) included in the target pull notification information are satisfied, the app 138 determines that the filter condition is satisfied (YES in S212).

In S214, the app 138 uses the target pull notification information to determine whether the timing condition is satisfied or not. The app 138 acquires date-and-time information included in the timing condition and determines whether the current date and time is after the date and time indicated by the acquired date-and-time information (hereafter the date and time may be referred to as "notification date and time"). When the current day and time is after the notification day and time, the app 138 determines that the timing condition is satisfied (YES in S214) and proceeds to S216, while when the current day and time is before the notification day and time, the app 138 determines that the timing condition is not satisfied (NO in S214) and proceeds to S220.

In S216, the app 138 adds the target pull notification information in the notification list 144.

In S220, the app 138 determines whether the processes of S210 to S216 (hereafter the processes may be referred to as "notification check process") have been executed on all the pull notification information associated with the display information "not yet displayed" in the receipt information table 140. When the app 138 determines that the notification check process has been executed on all the pull notification information (YES in S220), the app 138 proceeds to S222 while when the app 138 determines that the notification check process is not performed on one or moref pull notification information (NO in S220), the app 138 returns to S210. In other words, the app 138 repeats the notification check process until the notification check on all the pull notification information associated with the display information "not yet displayed" in the receipt information table 140 is completed.

In S222, the app 138 determines whether the notification list 144 is empty or not. When the notification list 144 is empty (YES in S222), the app 138 ends the process of FIG. 8. On the other hand, when the notification list 144 is not empty (NO in S222), the app 138 proceeds to S230.

In S230, the app 138 determines whether the screen displayed on the display 114 is the prohibited screen or not. In S230 after YES in S120 of FIG. 7, the app 138 determines whether the changed screen is the prohibited screen or not. When the screen displayed on the display 114 is the prohibited screen (YES in S230), the app 138 ends the process of FIG. 8. On the other hand, when the screen displayed on the display 114 is not the prohibited screen (NO in S230), the app 138 proceeds to S240.

In S240, the app 138 acquires one piece of pull notification information from the notification list 144.

In S242, the app 138 pop-up displays, on the display 114, the pull notification screen corresponding to the pull notification screen data included in the acquired pull notification information. On the pull notification screen, a message related to a cartridge (e.g., "would you like to purchase a cartridge?"), a message related to a remote print service (e.g., "would you like to subscribe to a remote print service?"), a message related to the flat-rate service (e.g., "would you like to subscribe to a flat-rate service?"), or the like.

In S244, the app 138 deletes the pull notification information corresponding to the acquired pull notification information from the notification list 144. Further, the app 138 changes the display information associated with the acquired pull notification information in the receipt information table 140 from "not yet displayed" to "displayed".

In S246, the app 138 determines whether a time which has elapsed since the pull notification screen was pop-up displayed exceeds a notification time (e.g., 10 seconds). When the elapsed time exceeds the notification time, the app 138 determines YES in S246 and proceeds to S248.

In S248, the app 138 deletes the pull notification screen from the display 114.

S250 is the same as S222. When the app 138 determines YES in S250, the app 138 ends the process of FIG. 8. On the other hand, when the app 138 determines NO in S250, the app 138 returns to S240. In other words, the app 138 repeatedly executes the processes of S240 to S248 until the notification list 144 becomes empty. In other words, the pull notification screen may be consecutively pop-up displayed on the display 114. When the notification list 144 includes the push notification information (see S20 of FIG. 6), the app 138 may display, on the display 114, the push notification screen corresponding to the push notification screen data included in the push notification information in S242.

Figure 9:
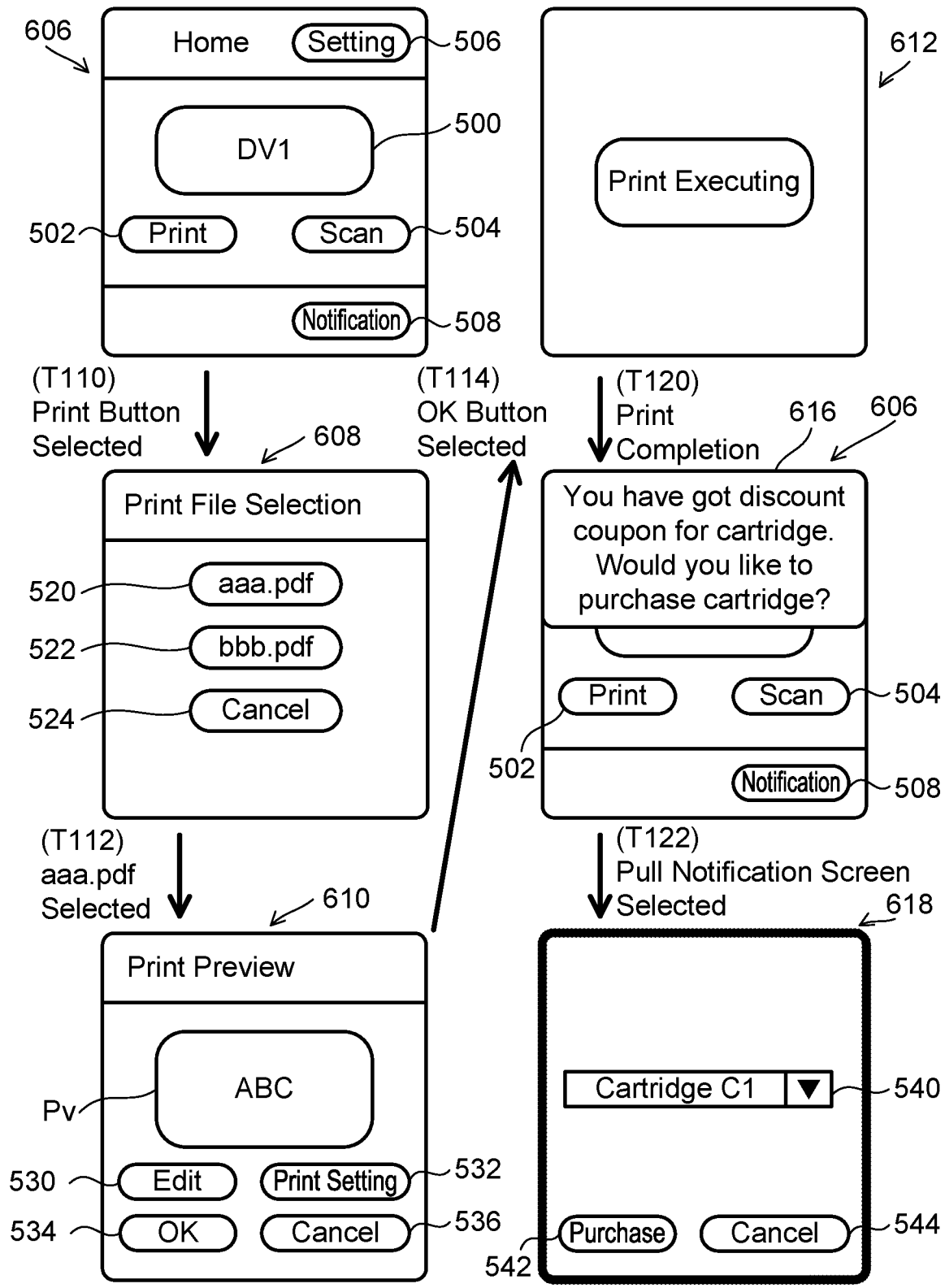
FIG. 9 illustrates Case A in which a pull notification screen related to a consumable is displayed.
Figure 10:
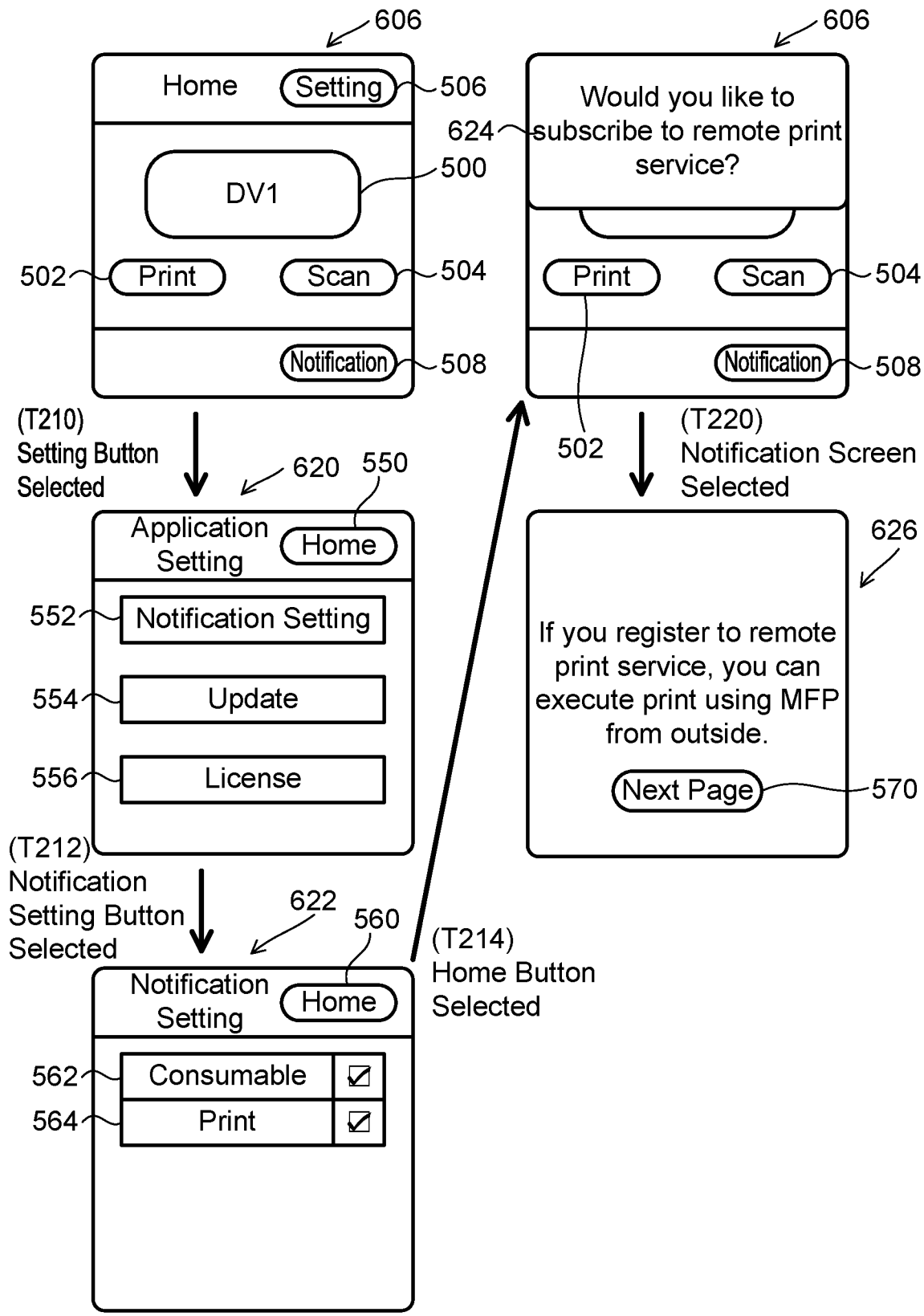
FIG. 10 illustrates Case B in which a pull notification screen related to a remote print service is displayed.
Figure 11:
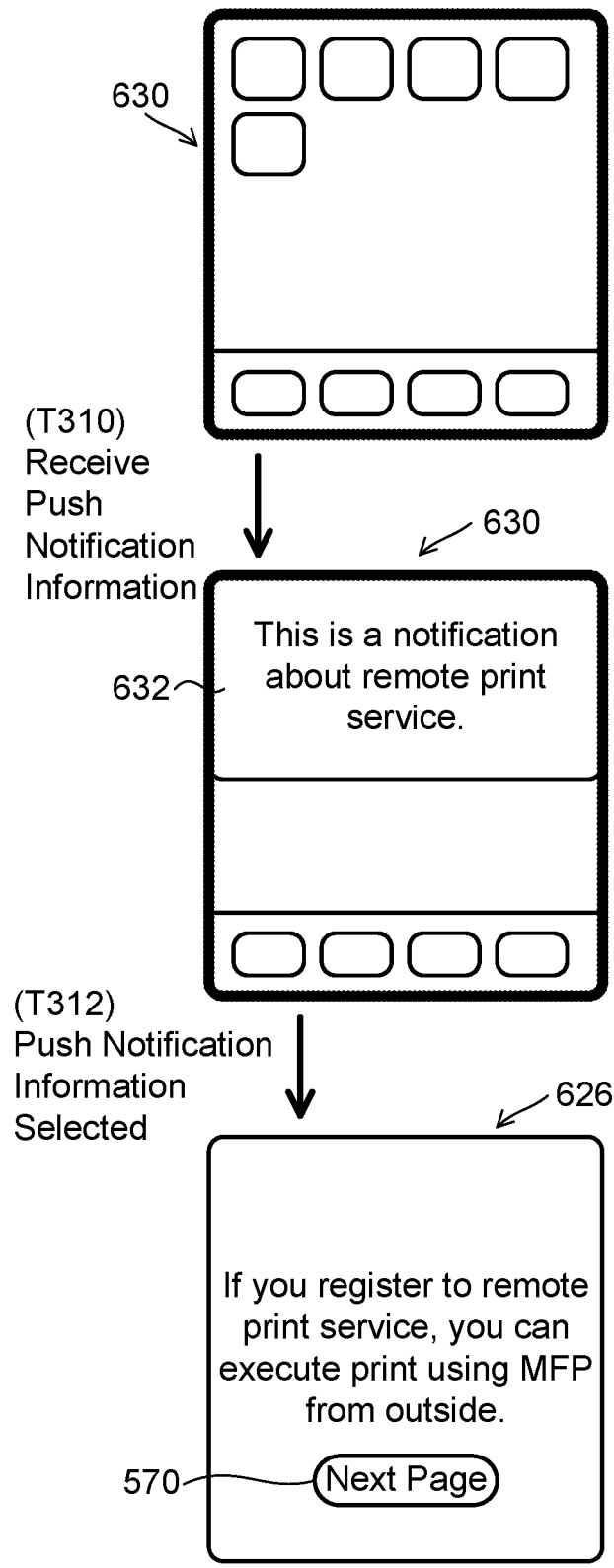
FIG. 11 illustrates Case C in which a push notification screen is displayed.

For example, when the print preview screen is displayed on the display 114, it is highly likely that the user wishes to cause the MFP 10 to execute printing. In such a situation, it bothers the user if the pull notification screen is displayed on the display 114. According to the aforementioned configuration, the terminal device 100 does not pop up the pull notification screen on the print preview screen when the filter condition is satisfied (YES in S212), the timing condition is satisfied (YES in S214), and the print preview screen is displayed on the display 114 (YES in S230). Consequently, the user can execute an operation to cause the MFP 10 to execute printing without being bothered by the pull notification screen. Accordingly, user convenience can be enhanced. Further, in general, when the pull notification screen is pop-up displayed on the display 114 and this pull notification screen is selected, a screen different from the currently-displayed screen is displayed on the display 114. Therefore, when the pull notification screen is pop-up displayed on the print preview screen and this pull notification is mistakenly selected, a screen different from the print preview screen is displayed on the display 114. In this case, the user needs to execute again the operation to display the print preview screen. According to the above configuration, since the pull notification screen is not displayed on the print preview screen, the print preview screen can be suppressed from being unintentionally changed. Accordingly, user convenience can be enhanced. When another screen included in the prohibited screen list 146 (e.g., the print image edit screen, the WFD setting screen) is displayed on the display 114 as well, the pull notification screen is not displayed on this screen, by which user convenience can be enhanced.
(Specific Cases; FIG. 9 to FIG. 11)

Next, with reference to FIG. 9 to FIG. 11, specific cases Case A to Case C executed by the processes of FIG. 6 to FIG. 8 will be described.
(Case A: FIG. 9)

With reference to FIG. 9, Case A in which a pull notification screen 616 related to the consumable (i.e., a cartridge) is pop-up displayed will be described. The initial state of Case A is the state after the registration process of FIG. 4. The device ID "DV1", the model name "MN1", the first registration information "not registered", the second registration information "not registered", the first support information "ON" and the second support information "ON" are stored in the device table 142 in association with each other. Further, the display information "not yet displayed" and the first pull notification information PL 1 (see FIG. 2) including the notification ID "ID1", the type information "consumable", the consumable condition "remaining amount≤threshold" and the timing condition "Jan. 1, 2022 10:00" are stored in the receipt information table 140 in association with each other. The remaining amount information "20" of the MFP 10A is stored in the memory 134 of the terminal device 100. The current date and time is "Jan. 1, 2022 9:58". Hereafter, a screen displayed on the display 114 when the state of the app 138 is the foreground state will be illustrated by a thin line and a screen displayed on the display 114 when the state of the app 138 is the background state will be illustrated by a thick line.

As illustrated in FIG. 9, in the initial state of Case A, a home screen 606 is displayed on the display 114 of the terminal device 100. The home screen 606 is the same as the home screen 604 of FIG. 5.

In T110, when the app 138 accepts selection of the print button 502, the app 138 displays a file selection screen 608 on the display 114. The file selection screen 608 includes file selection buttons 520, 522 for selecting a file to be printed and a cancel button 524. The app 138 determines that the screen displayed on the display 114 has been changed from the home screen 606 to the file selection screen 608 (YES in S120 of FIG. 7), and executes the pull notification display process (see FIG. 8). The app 138 identifies the first pull notification information PL1 associated with the display information "not yet displayed" in the receipt information table 140 as the target pull notification information (S210 of FIG. 8). Next, the app 138 determines whether the filter condition is satisfied (S212). First, the app 138 identifies that the type information in the first pull notification information PL1 is "consumable" and determines that the consumable notification flag 148 is "ON". Next, the app 138 determines that the first pull notification information PL1 does not includes the first registration condition, the first support condition or the second support condition but includes the consumable condition. Then, the app 138 determines that the remaining amount "20" indicated by the remaining amount information of the MFP 10A stored in the memory 134 is equal to or lower than a threshold in the consumable condition (e.g., "30"). In this case, the app 138 determines that the filter condition is satisfied (YES in S212). Next, the app 138 determines that the current date and time "Jan. 1, 2022 9:58" is before the notification date and time "Jan. 1, 2022 10:00" and determines that the timing condition is not satisfied (NO in S214). In this case, the first pull notification information PL1 is not added to the notification list 144. Next, the app 138 determines that the notification check on all the pull notification information associated with the display information "not yet displayed" in the receipt information table 140 has been completed (YES in S220) and determines that the notification list 144 is empty (YES in S222). In this case, the pull notification screen is not pop-up displayed.

When the app 138 accepts selection of the file selection button 520 in T112, the app 138 displays a print preview screen 610 on the display 114. The print preview screen 610 includes a print preview image Pv, an edit button 530 for displaying the print image edit screen, a print setting button 532 for displaying the print setting screen, an OK button 534 and a cancel button 536. The app 138 determines that the screen displayed on the display 114 has been changed from the file selection screen 608 to the print preview screen 610 (YES in S120 of FIG. 7) and executes the pull notification display process (see FIG. 8). As with the case in which the file selection screen 608 is displayed, the app 138 identifies the first pull notification information PL1 as the target pull notification information (S210 of FIG. 8) and determines that the filter condition is satisfied (YES in S212). The current date and time at the time of T112 is "Jan. 1, 2022 10:02". The app 138 determines that the current date and time "Jan. 1, 2022 10:02" is after the notification date and time "Jan. 1, 2022 10:00" in the timing condition, determines that the timing condition is satisfied (YES in S214) and adds the first pull notification information PL1 in the notification list 144 (S216). Next, the app 138 determines that the notification check on all the pull notification information has been completed (YES in S220) and determines that the notification list 144 is not empty (NO in S222). Next, the app 138 determines that the print preview screen 610 displayed on the display 114 is the prohibited screen (YES in S230). In this case, the pull notification screen is not pop-up displayed.

When the app 138 accepts selection of the OK button in T114, the app 138 sends a print instruction including the selected file "aaa.pdf" to the MFP 10A and displays the print executing screen 612 on the display 114. In the print executing screen, a message indicating that printing is being executed by the MFP 10A is displayed. Further, the app 138 determines that the screen displayed on the display 114 has been changed from the print preview screen 610 to the print executing screen 612 (YES in S120 of FIG. 7) and executes the pull notification display process (see FIG. 8). As with the case in which the print preview screen 610 is displayed on the display 114, the app 138 adds the first pull notification information PL1 in the notification list 144 (S210 to S220 of FIG. 8). Next, the app 138 determines that the notification list 144 is not empty (NO in S222) and determines that the print executing screen 612 displayed on the display 114 is the prohibited screen (YES in S230). In this case as well, the pull notification screen is not pop-up displayed.

When the app 138 receives the print completion notification from the MFP 10A in T120, the app 138 displays the home screen 606 on the display 114. The app 138 determines that the screen displayed on the display 114 has been changed from the print executing screen 612 to the home screen 606 (YES in S120 of FIG. 7) and executes the pull notification display process (see FIG. 8). As with the case in which the print preview screen 610 is displayed on the display 114, the app 138 adds the first pull notification information PL1 in the notification list 144 (S210 to S220 of FIG. 8). Then, the app 138 determines that the notification list 144 is not empty (NO in S222) and determines that the home screen 606 displayed on the display 114 is not the prohibited screen (NO in S230). In this case, the app 138 acquires the first pull notification information PL1 from the notification list 144 (S242) and pop-up displays the pull notification screen 616 corresponding to the pull notification screen data MD1 included in the first pull notification information PL1 on the home screen 606. On the pull notification screen 616, a message indicating that a discount coupon for a cartridge is received and a message inquiring whether the user wants to purchase a cartridge are displayed.

When the app 138 accepts an operation to select the pull notification screen 616 in T122, the app 138 supplies an URL corresponding to a cartridge purchase page 618 to the OS 136. The OS 136 accesses the URL and displays the cartridge purchase page 618 on the display 114. Consequently, the state of the app 138 transitions from the foreground state to the background state. The cartridge purchase page 618 includes a cartridge selection box 540 for selecting a type of a cartridge to be purchased, an OK button 542 and a cancel button 544. As described above, the user can easily purchase a cartridge in response to selecting the pull notification screen 616.

(Effects of Case A)

As described in Case A, when the filter condition and the timing condition are satisfied (YES in S212 and YES in S214 of FIG. 7) and the display is changed from the print executing screen 612 to the home screen 606, the terminal device 100 displays the pull notification screen 616 on the home screen 606. With such a configuration, the pull notification screen can pop up at a suitable timing as compared to a configuration in which the pull notification screen 616 is not displayed despite the display being changed from the print executing screen 612 (i.e., the prohibited screen) to the home screen 606 (i.e., a screen not being the prohibited screen). Accordingly, user convenience can be enhanced.

(Case B: FIG. 10)

With reference to FIG. 10, Case B in which a pull notification screen 624 related to the remote print service is displayed will be described. The initial state of Case B is the same as the initial state of Case A except that the display information "not yet displayed" and the second pull notification information PL2 including the notification ID "ID2", the type information "service", the first registration condition "not registered", the first support condition "ON" and the timing condition "Jan. 2, 2022 10:00" are stored in the receipt information table 140 in association with each other and that the current date and time is "Jan. 2, 2022 9:58".

When the app 138 accepts selection of the setting button 506 in T210, the app 138 displays an app setting screen 620 on the display 114. The app setting screen 620 includes a home button 550 for displaying the home screen, the notification setting button 552 for displaying a notification setting screen 622 on which settings of the consumable notification flag 148 and the service notification flag 150 can be changed, an update button 554 for updating the app 138 and a license button 556 for checking license information of the app 138. The app 138 determines that the screen displayed on the display 114 has been changed from the home screen 606 to the app setting screen 620 (YES in S120 of FIG. 7) and executes the pull notification display process (see FIG. 8). The app 138 identifies the second pull notification information PL2 associated with the display information "not yet displayed" in the receipt information table 140 as the target pull notification information (S210 of FIG. 8). Next, the app 138 determines whether the filter condition is satisfied (S212). The app 138 firstly identifies that the type information in the second pull notification information PL2 is "service" and determines that the service notification flag 150 is "ON". Next, the app 138 determines that the first registration condition "not registered" in the second pull notification information PL2 and the first registration information "not registered" of the MFP 10A in the device table 142 match, and determines that the first support condition "ON" in the second pull notification information PL2 and the first support information "ON" of the MFP 10A in the device table 142 match. In this case, the app 138 determines that the filter condition is satisfied (YES in S212). Next, the app 138 determines that the current date and time "Jan. 2, 2022 9:58" is before the notification date and time "Jan. 2, 2022 10:00" and determines that the timing condition is not satisfied (NO in S214). In this case, the second pull notification information PL2 is not added to the notification list 144. Next, the app 138 determines that the notification check on all the pull notification information associated with the display information "not yet displayed" in the receipt information table 140 has been completed (YES in S220) and determines that the notification list 144 is empty (YES in S222). In this case, the pull notification screen is not pop-up displayed.

When the app 138 accepts selection of the notification setting button 552 in T212, the app 138 displays a notification setting screen 622 on the display 114. The notification setting screen 622 includes a home button 560, a consumable notification setting box 562 for changing settings of the consumable notification flag 148 and a service notification setting box 564 for changing settings of the service notification flag 150. As with the case in which the app setting screen 620 is displayed, the app 138 determines that the filter condition is satisfied (YES in S212), determines that the timing condition is not satisfied (YES in S214) and does not add the second pull notification information PL2 to the notification list 144 (S216). Next, the app 138 determines that the notification check on all the pull notification information has been completed (YES in S220) and determines that the notification list 144 is empty (NO in S222). In this case as well, the pull notification screen is not pop-up displayed.

When the app 138 accepts selection of the home button 560 in T214, the app 138 displays the home screen 606 on the display 114. The current date at the time of T214 is "Jan. 2, 2022 10:01". Therefore, the app 138 determines that the filter condition is satisfied (YES in S212), determines that the timing condition is satisfied (YES in S214), and adds the second pull notification information PL2 to the notification list 144 (YES in S216). Next, the app 138 determines that the notification check on all the pull notification information has been completed (YES in S220), determines that the notification list 144 is not empty (NO in S222) and determines that the home screen 606 displayed on the display 114 is not the prohibited screen (NO in S230). In this case, the app 138 acquires the second pull notification information PL2 from the notification list 144 (S242) and pop-up displays the pull notification screen 624 corresponding to the pull notification screen data MD2 included in the second pull notification information PL2 on the home screen 606. On the pull notification screen 624, a message to prompt the user to subscribe to the remote print service is displayed.

When the app 138 accepts an operation to select the pull notification screen 624 in T220, the app 138 displays a remote print service introduction screen 626 on the display 114. The remote print service introduction screen 626 includes a message indicating contents of the remote print service and a button 570 to proceed to the next page. Consequently, it is possible to introduce the contents of the remote print service to the user and prompt the user to subscribe to the remote print service.

(Case C)

Next, with reference to FIG. 11, Case C in which the push notification screen 632 is displayed will be described. The initial state of Case C is the state after the registration process of FIG. 4, and the state of the app 138 is the background state. The previous screen is the home screen 606 (see FIG. 10). A top screen 630 is displayed on the display 114.

When the app 138 receives the push notification information from the notification server 200 in T310, the app 138 determines that the state of the app 138 is the background state (YES in S10 of FIG. 6) and supplies a notification instruction including the received push notification instruction to the OS 136 (S30). When the OS 136 acquires the notification instruction from the app 138, the OS 136 pop-up displays the push notification screen 632 corresponding to the push notification screen data included in the push notification information on the display 114. On the push notification screen 632, a message to notify the user of the remote print service is displayed.

When the OS 136 accepts selection of the push notification screen 632 in T312, the OS 136 supplies a foreground transition instruction to the app 138. The foreground transition instruction of the present case is an instruction causing the state of the app 138 to transition from the background state to the foreground state and is also an instruction for displaying the remote print service introduction screen 626 on the display 114. When the app 138 acquires the foreground transition instruction from the OS 136 (S32 of FIG. 6), the app 138 determines that the home screen 606 which is a screen last displayed in the previous foreground state is not the prohibited screen (NO in S34) and displays the remote print service introduction screen 626 on the display 114.

(Effects of Present Embodiment)

As described above, the terminal device 100 receives the push notification information or the pull notification information from the notification server 200. The terminal device 100 selectively displays one of a plurality of screens (e.g., the home screen 606, the file selection screen 608, the print preview screen 610 of FIG. 9). When the filter condition and the timing conditions are satisfied (YES in S212 and YES in S214 of FIG. 8) and a screen which is not the prohibited screen (e.g., the home screen 606) is displayed (NO in S230), the terminal device 100 displays the push notification screen or the pull notification screen on the screen. When the filter condition and the timing condition are satisfied (YES in S212 and YES in S214 of FIG. 8) and the prohibited screen is displayed (YES in S230), neither the push notification screen nor the pull notification screen is displayed on the prohibited screen. Further, when the filter condition or the timing condition is not satisfied (NO in S212 or NO in S214), neither the push notification screen nor the pull notification screen is displayed. Therefore, depending on the screen displayed on the display 114 of the terminal device 100, whether to display the push notification screen or the pull notification screen can be changed. Accordingly, user convenience can be enhanced.

(Corresponding Relationships)

The push notification information and the pull notification information are examples of "notification information". The home screen 606, the file selection screen 608, the print preview screen 610 of FIG. 9, and the like, are examples of "a plurality of screens". The case in which YES is determined in S212 and YES is determined in S214 of FIG. 8 is an example of "the predetermined condition is satisfied". The case in which NO is determined in S212 or NO is determined in S214 of FIG. 8 is an example of "the notification information is not displayed". The screen which is not the prohibited screen (e.g., the home screen 606 of FIG. 9) is an example of "first screen". The prohibited screen (e.g., the print preview screen 610 of FIG. 9) is an example of "second screen". The MFP 10A is an example of "image forming device". The print instruction or the scan instruction is an example of "execution instruction". The print preview screen, the print setting screen, the print executing screen, the scan setting screen and the scan executing screen are examples of "screen related to the execution instruction". The print image edit screen and the scan image edit screen are examples of "screen for editing image data". The MFP 10A, the AP and the Wi-Fi setup screen are an example of "communication device", "external device" and "screen for establishing a wireless connection", respectively. The MFP 10A, the terminal device 100 and the WFD setting screen are an example of "communication device", "external device" and "screen for establishing a wireless connection", respectively. The pull notification information request is an example of "notification information request". The remote print service and the flat-rate service are examples of "predetermined service".

T52 of FIGS. 4 and S114 of FIG. 7 are examples of "receive notification information". T60 of FIG. 4 and the like are examples of "selectively display one screen". S242 of FIG. 8 is an example of "display the notification information on the first screen".

(First Modification) An allowed screen list may be stored in the memory 134 of the terminal device 100 instead of the prohibited screen list 146. The allowed screen list is a list of screens on which pop-up of the push notification screen or the pull notification screen is allowed (i.e., allowed screens). The allowed screen list includes, for example, a home screen, a file selection screen, an app setting screen and a notification setting screen. In the present modification, the app 138 determines in S34 of FIG. 6 whether the previous screen is the allowed screen or not. When the previous screen is the allowed screen, the app 138 proceeds to S36. When the previous screen is not the allowed screen, the app 138 ends the process of FIG. 6. The app 138 determines in S230 of FIG. 8 whether the screen displayed on the display 114 is the allowed screen. When the screen displayed on the display 114 is the allowed screen, the app 138 proceeds to S240, while when the screen displayed on the display 114 is not the allowed screen, the app 138 ends the process of FIG. 8. In the present modification, the allowed screen and a screen which is not the allowed screen are an example of "first screen" and "second screen", respectively.

(Second Modification) After the display of the prohibited screen on the display 114 is changed to a screen which is not the prohibited screen, the app 138 may not display the pull notification information on the display 114. For example, the app 138 may display the pull notification information on the display 114 when another screen which is not the prohibited screen is further displayed after the display of the prohibited screen on the display 114 is changed to the screen which is not the prohibited screen.

(Third Modification) The prohibited screen list may not include any one of the screens related to the print instruction (e.g., the print preview screen, print setting screen and the print executing screen), the screens related to the scan instruction (e.g., the scan setting screen and scan executing screen), the screens for editing image data (e.g., the print image data, the scan image data) (e.g., the print image edit screen and scan image edit screen), and the screens for establishing a wireless connection with the external device (e.g., the WFD setting screen and the Wi-Fi set-up screen).

(Fourth Modification) Under the environment in which the terminal device 100 does not receive the push notification information, the process of FIG. 6 can be omitted.

(Fifth Modification) Under the situation in which the terminal device 100 does not receive the pull notification information, FIGS. 7 and S210 to S222 of FIG. 8 can be omitted. In the present modification, when the push notification information is received from the notification server 200 and NO is determined in S10 of FIG. 6 (i.e., when the state of the app 138 is the foreground state), the app 138 executes S230 to S250 of FIG. 8.

(Sixth Modification) The pull notification information may include a version condition to designate a version of the MFP app 138. In the present modification, the app 138 determines in S212 of FIG. 8 whether the current version of the MFP app 138 installed in the terminal device 100 is equal to or greater than a predetermined version indicated by the version condition in the pull notification information. When the current version of the MFP app 138 is equal to or greater than the predetermined version, the app 138 determines that the filter condition is satisfied.

(Seventh Modification) In the above embodiments, the processes of FIGS. 4 to 11 are implemented by a software (e.g., the program 136, 138), however, at least one of these processes may be implemented by hardware such as a logic circuit. In the present disclosure, the phrase "at least one of A, B, and C" means "(A), (B), (C), (A and B), (A and C), (B and C) or (A, B and C)".

What is claimed is:

1. A non-transitory computer-readable recording medium storing computer-readable instructions for a terminal device, wherein the terminal device comprises:
a processor: and
a display,
wherein the computer-readable instructions, when executed by the processor, cause the terminal device to:
receive notification information from a notification server;
selectively display one screen among a plurality of screens on the display;
in a case where a predetermined condition is satisfied and a first screen among the plurality of screens is displayed, display the notification information on the first screen, the predetermined condition being satisfied in a case where a communication device different from the terminal device supports a predetermined service;
in a case where the predetermined condition is satisfied and a second screen among the plurality of screens is displayed, not display the notification information on the second screen;
in a case where the predetermined condition is not satisfied, not display the notification information; and
in a case where the predetermined condition is satisfied and display on the display is changed from the second screen to the first screen, the notification information is displayed on the first screen.

2. The non-transitory computer-readable recording medium as in claim 1, wherein
the computer-readable instructions, when executed by the processor, further cause the terminal device to:
send an execution instruction for causing an image forming device to execute at least one of a print function and a scan function to the image forming device,
wherein the second screen is a screen related to the execution instruction.

3. The non-transitory computer-readable recording medium as in claim 1, wherein
the second screen is a screen for editing image data.

4. The non-transitory computer-readable recording medium as in claim 1, wherein
the second screen is a screen for establishing a wireless connection between an external device and the communication device.

5. The non-transitory computer-readable recording medium as in claim 1, wherein
in response to a notification information request for requesting the notification server to send the notification information being sent from the terminal device to the notification server, the notification information is sent from the notification server to the terminal device.

6. The non-transitory computer-readable recording medium as in claim 1, wherein
the notification information is sent from the notification server to the terminal device without a notification information request for requesting the notification server to send the notification information being sent from the terminal device to the notification server.

7. The non-transitory computer-readable recording medium as in claim 1, wherein in a case where the communication device different from the terminal device does not support the predetermined service,
the predetermined condition is satisfied in at least one case in which:
a type of the notification information is a predetermined type,
a communication device different from the terminal device is registered in a predetermined service,
a remaining amount of consumable of a communication device different from the terminal device is less than or equal to threshold value,
a notification timing of the notification information designated by the notification server is satisfied, and
a version of the computer-readable instructions is a predetermined version or newer.

8. The non-transitory computer-readable recording medium as in claim 1, wherein
the predetermined condition is satisfied in the case where the communication device supports the predetermined service and is already registered in the predetermined service.

9. The non-transitory computer-readable recording medium as in claim 1, wherein
the predetermined condition is satisfied in the case where the communication device supports the predetermined service and is not yet registered in the predetermined service.

10. The non-transitory computer-readable recording medium as in claim 1, wherein
the communication device is a printer, and
the predetermined service includes automatic ordering service of automatically ordering a new cartridge.

11. A terminal device comprising:
a controller; and
a display,
wherein the controller is configured to:
receive notification information from a notification server;
selectively displaying one screen among a plurality of screens on the display;
in a case where a predetermined condition is satisfied and a first screen among the plurality of screens is displayed, display the notification information on the first screen, the predetermined condition being satisfied in a case where a communication device different from the terminal device supports a predetermined service, in a case where the predetermined condition is satisfied and a second screen among the plurality of screens is displayed, not display the notification information on the second screen;

in a case where the predetermined condition is not satisfied, not display the notification information; and in a case where the predetermined condition is satisfied and display on the display is changed from the second screen to the first screen, the notification information is displayed on the first screen.

12. The terminal device as in claim 11, wherein the predetermined condition is satisfied in the case where the communication device supports the predetermined service and is not yet registered in the predetermined service.

13. A method for controlling a terminal device, the method comprising:

receiving notification information from a notification server;

selectively display one screen among a plurality of screens on a display of the terminal device; and in a case where a predetermined condition is satisfied and a first screen among the plurality of screens is displayed, displaying the notification information on the first screen, the predetermined condition being satisfied in a case where a communication device different from the terminal device supports a predetermined service, in a case where the predetermined condition is satisfied and a second screen among the plurality of screens is displayed, not displaying the notification information on the second screen;

in a case where the predetermined condition is not satisfied, not displaying the notification information; and in a case where the predetermined condition is satisfied and display on the display is changed from the second screen to the first screen, the notification information is displayed on the first screen.

14. The method according to claim 13, further comprising send an execution instruction for causing an image forming device to execute at least one of a print function and a scan function to the image forming device, wherein the second screen is a screen related to the execution instruction.

15. The method according to claim 13, wherein the second screen is a screen for editing image data.

16. The method according to claim 13, wherein the second screen is a screen for establishing a wireless connection between an external device and the communication device.

17. The method according to claim 13, wherein in response to a notification information request for requesting the notification server to send the notification information being sent from the terminal device to the notification server, the notification information is sent from the notification server to the terminal device.

18. The method according to claim 13, wherein the notification information is sent from the notification server to the terminal device without a notification information request for requesting the notification server to send the notification information being sent from the terminal device to the notification server.

19. The method according to claim 13, wherein in a case where the communication device different from the terminal device does not support the predetermined service, the predetermined condition is satisfied in at least one case in which:

a type of the notification information is a predetermined type, a communication device different from the terminal device is registered in a predetermined service, a remaining amount of consumable of a communication device different from the terminal device is less than or equal to threshold value, a notification timing of the notification information designated by the notification server is satisfied.

* * * * *